UNITED STATES PATENT OFFICE.

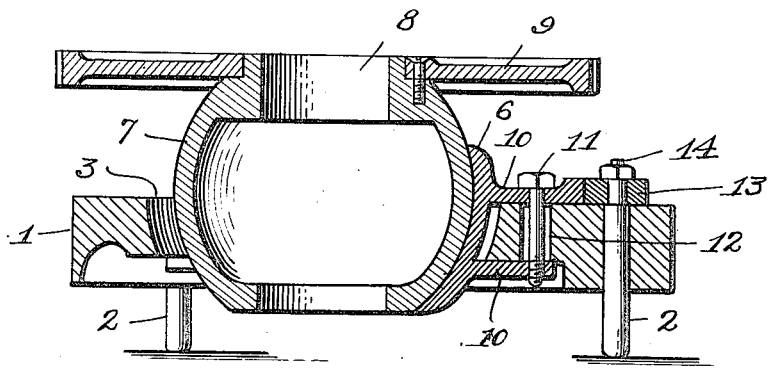
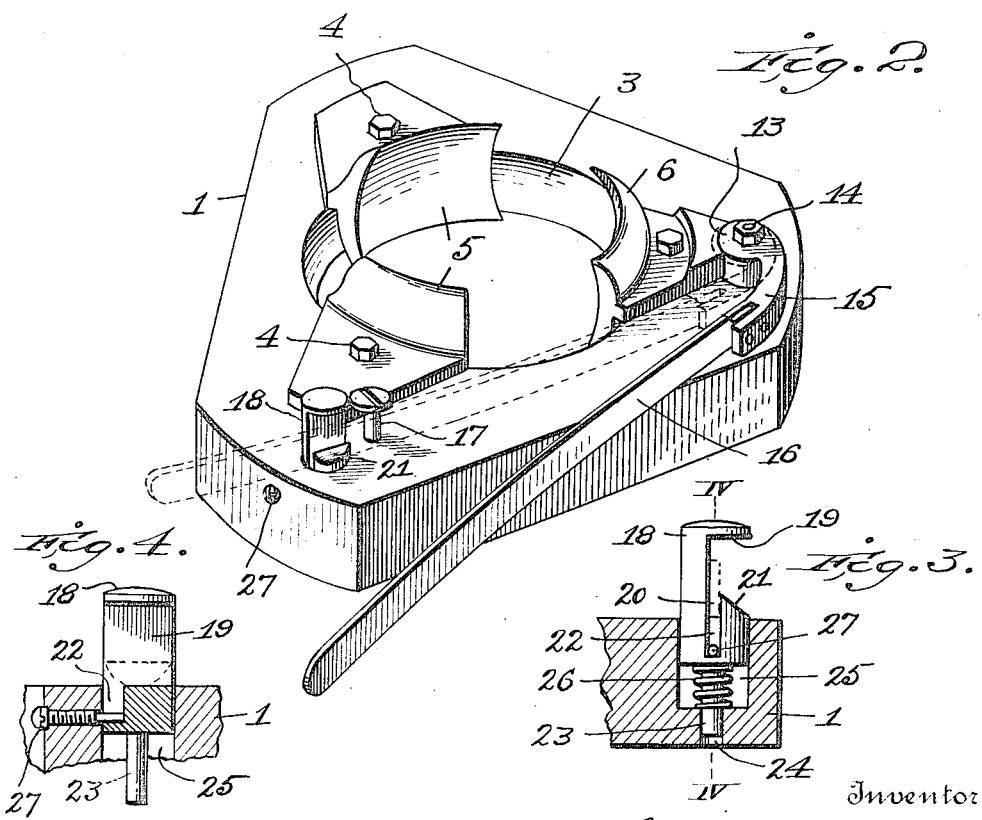

CARL E. AKELEY, OF NEW YORK, N. Y., ASSIGNOR TO AKELEY CAMERA, INC., OF NEW YORK, N. Y., A CORPORATION OF NEW YORK.

CLAMPING MECHANISM FOR CAMERAS AND THE LIKE.

1,288,461.

Specification of Letters Patent.

Patented Dec. 24, 1918.

Application filed December 14, 1917. Serial No. 207,092.

*To all whom it may concern:*

Be it known that I, CARL E. AKELEY, a citizen of the United States, residing in the borough of Manhattan, city of New York, and State of New York, have invented certain new and useful Improvements in Clamping Mechanism for Cameras and the like, of which the following is a specification.

My invention relates to locking mechanism, more particularly adapted to motion picture cameras for retaining the camera in any adjusted position on its base, and has for its specific objects certain improvements in the general construction disclosed in an application for Letters Patent filed by me May 8, 1916, Serial No. 96,197.

In said application the camera casing is capable of universal adjustment upon its base, through the medium of a spherical member seated in a plurality of jaws in the base, one of said jaws being adapted to be shifted by means of a cam to clamp said spherical member in any adjusted position between said movable jaw and its opposing fixed jaws. The present invention involves the use of this mechanism, and in addition thereto a spring arm and a releasable catch for holding said arm in such position that its resiliency will operate securely to press the movable jaw into holding contact with the spherical member.

Referring to the accompanying drawing:—

Figure 1 is a vertical sectional view of a camera base and the spherical socket adapted to be fixed to the bottom of the camera casing, having my improved locking mechanism applied thereto.

Fig. 2 is a perspective view of said base, the spherical member being omitted.

Fig. 3 is an enlarged detail side elevation of the spring arm catch shown in position in the base, said base being shown in section.

Fig. 4 is a view similar to Fig. 3 taken on the line IV—IV of Fig. 3.

Similar numerals of reference denote corresponding parts in the several views.

In the said drawing, the reference numeral 1 denotes a base supported by suitable legs 2, which are adapted to rest upon any suitable support, or may be fitted into the top plate of a tripod. Said base is provided with a circular aperture 3, and disposed in said aperture and fixed to said base by bolts 4 are two fixed jaws 5 and a similar but movable jaw 6, said jaws being disposed at intervals equally spaced apart and being concaved on their inner faces accurately to fit the exterior surface of a spherical member 7. Said member 7 is centrally apertured at 8 to receive a depending extension on the camera casing (not shown), and also may be provided with a gear wheel 9 for transmitting motion to the camera casing in the manner disclosed in my application hereinbefore referred to, said feature, however, forming no part of the present invention. Each of the jaws 5 and 6 is formed with upper and lower extensions 10 adapted to embrace the base 1, and the movable jaw 6 is retained in position by a bolt 11 similar to the bolts 4, but passing through a slightly elongated slot 12 in said base 1, whereby said jaw 6 is permitted limited movement toward and from the center of the aperture 3. The outer end of said jaw 6 is concaved to receive a cam 13, pivoted upon the base 1 by means of a bolt 14, and having an arm 15 extending angularly therefrom, said arm being slotted at its outer extremity to receive the inner end of a comparatively strong spring arm 16, said spring arm preferably being riveted on said extension 15. The said spring arm 16 is long enough to extend across one side of the base 1 and to contact with a headed stop-pin 17 screwed into said base 1. Just beyond said headed stop-pin is located a catch 18, the same being recessed in one face at 19, and being provided with a central cross-slot 20 at the lower inner wall of said recess 19, the body of said catch outside of said cross-slot being beveled at 21, as shown, and said slot 20 being extended downwardly at one side at 22, for a purpose hereinafter to be described. A guide pin 23 is fixed to the lower end of said catch 18, and is adapted to engage in a smaller aperture 24 in the base 1 located at the bottom of a larger aperture 25, which latter receives the body of said catch 18. Disposed between said catch 18 and the bottom of said larger aperture 25 is a coiled spring 26, while removably disposed in the base 1 is a screw pin 27 adapted at its inner 10' end to engage the extension 22 of the slot 20 in the catch 18 to limit the upward movement of said catch under the tension of the spring 26.

In operation, with the spherical member

7 seated in the jaws 5 and 6, and with the spring arm 16 in the full line position shown in Fig. 2, the cam 13 will be exerting no pressure upon the movable jaw 6, and said spherical member 7 will be free to be adjusted universally to any desired position. But when the spring arm 16 is moved to the dotted line position shown in Fig. 2, it will strike the inclined face 21 of the catch 18, depressing the latter against the tension of the spring 26 until said spring arm registers with the slot 20, when said catch will be forced upward again automatically to retain said spring arm in this position, the head of the screw-stop 17 acting as a stop to prevent any accidental upward movement to disengaging position. To release the spring arm 16, the catch 18 is pressed downward until the edge of its inclined face 21 passes below the top surface of the base 1, which will release said arm 16.

By my improved construction the tension of the spring arm 16, when retained by the catch 18, is ample to exert, through the cam 13, such a wedging action upon jaw 6 as most firmly to hold the spherical member 7 in any adjusted position. At the same time, said lock can be applied instantly by a single movement of said spring arm 16, and can be released as quickly by a slight downward pressure upon the catch 18, by which said spring arm 16 is permitted automatically to assume the full line position, thus releasing the movable jaw.

While I have described my improved device as particularly applicable to motion picture cameras, it will be understood that I do not limit myself to such use, as the same is capable of application to many other devices wherein a quickly adjustable and secure locking mechanism is desired.

Having thus described my invention, what I claim as new and desire to secure by Letters Patent, is:—

1. A clamping mechanism for cameras and the like, comprising a base, a spherical member adapted to support a camera casing or other article and adjustable universally on said base, means for clamping said spherical member in any adjusted position in said base comprising a movable jaw, a cam for operating said jaw, a spring arm for operating said cam, and a catch for engaging said spring arm when the latter is brought under tension to apply said cam.

2. A clamping mechanism for cameras and the like, comprising a base, a member adapted to support a camera casing or other article and adjustable in said base, and means for clamping said member in any adjusted position in said base comprising a movable jaw, a cam for operating said jaw, a spring arm for operating said cam, and a spring-projected catch adapted automatically to engage the free end of said spring and retain it under tension when the latter is moved into contact with said catch in applying said jaw operating cam.

3. A clamping mechanism for cameras and the like, comprising a base, a member adapted to support a camera casing or other article and adjustable in said base, means for clamping said member in any adjusted position in said base comprising a movable jaw, a cam for operating said jaw, a spring arm for operating said cam, a catch for engaging said spring arm automatically when the latter is brought under tension to apply said cam, and a stop for preventing accidental disengagement of said spring arm from said catch.

4. A clamping mechanism for cameras and the like, comprising a base, a member adapted to support a camera casing or other article and adjustable in said base, and means for clamping said member in any adjusted position in said base comprising a movable jaw, a cam for operating said jaw, a spring arm for operating said cam, a spring-projected catch adapted automatically to engage the free end of said spring and retain it under tension when the latter is moved into contact with said catch in applying said jaw operating cam, and a stop for preventing accidental disengagement of said spring arm from said position.

In testimony whereof, I hereunto set my hand this 7" day of December, 1917.

CARL E. AKELEY.